(No Model.) 2 Sheets—Sheet 1.

I. SHOUDY, Jr.
POWER CONVERTER.

No. 455,009. Patented June 30, 1891.

Witnesses:
J. A. Southworth.
E. Behel.

Inventor:
Israel Shoudy Jr.
By A. O. Behel
Atty.

(No Model.)  2 Sheets—Sheet 2.

I. SHOUDY, Jr.
POWER CONVERTER.

No. 455,009. Patented June 30, 1891.

Witnesses:
J. A. Southworth
E. Behel

Inventor:
Israel Shoudy Jr.
By A. O. Behel
Attys.

UNITED STATES PATENT OFFICE.

ISRAEL SHOUDY, JR., OF ROCKFORD, ILLINOIS, ASSIGNOR OF ONE-HALF TO BELLE E. SHOUDY, OF SAME PLACE.

POWER-CONVERTER.

SPECIFICATION forming part of Letters Patent No. 455,009, dated June 30, 1891.

Application filed August 9, 1890. Serial No. 361,488. (No model.)

*To all whom it may concern:*

Be it known that I, ISRAEL SHOUDY, Jr., a citizen of the United States, residing at Rockford, in the county of Winnebago and State of Illinois, have invented certain new and useful Improvements in Power-Converters, of which the following is a specification.

The object of this invention is to change the reciprocating movement into a rotary movement, and is employed more especially in connection with windmills.

Figure 1:
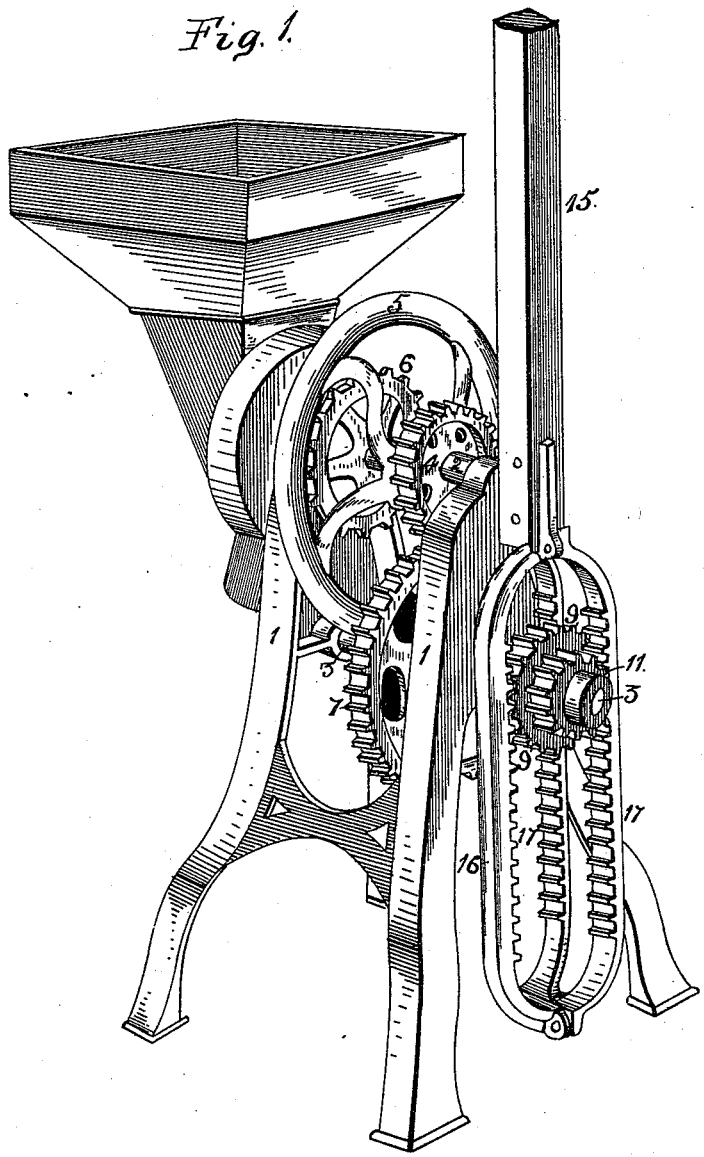
Figure 2:
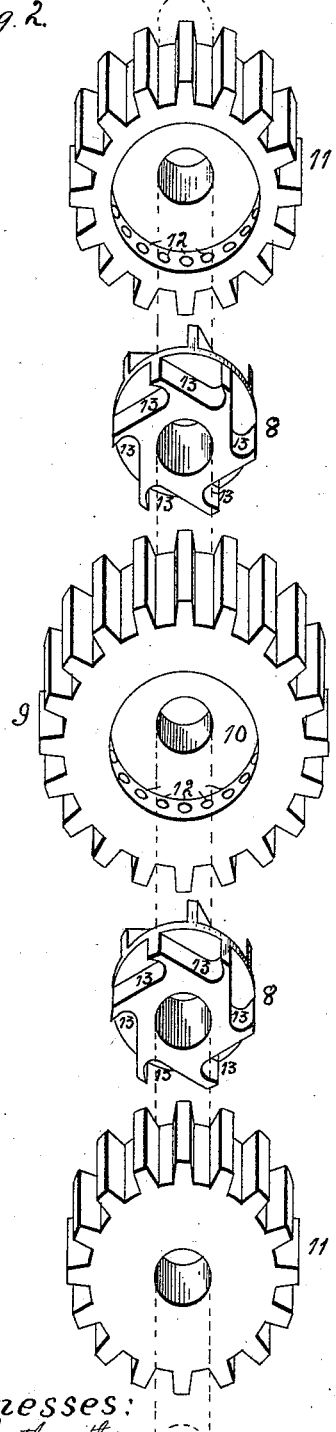
Figure 3:
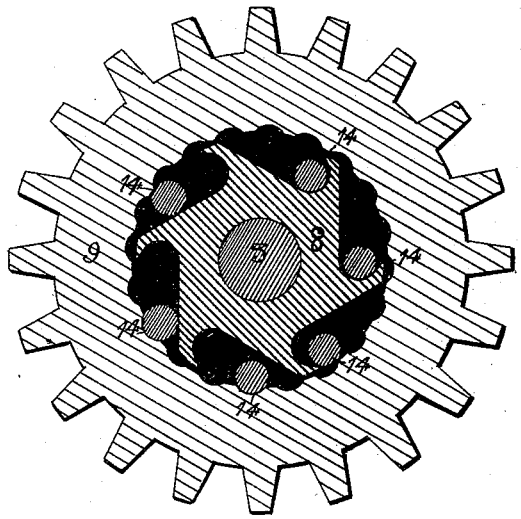

In the accompanying drawings, Figure 1 is a perspective view of a power-converter embodying the features of my invention. Fig. 2 is an isometrical representation of the clutching mechanism. Fig. 3 is a vertical section through the gear-wheel 9, showing the relation of the clutch and the position of the balls.

Within a suitable frame 1 are supported two horizontal shafts 2 and 3. On the upper shaft 2 are placed a gear-pinion 4, balance-wheel 5, and sprocket-wheel 6 to revolve therewith.

A large gear-wheel 7 is placed on the shaft 3 and meshes with the pinion 4. Rotary motion is imparted to the shaft 3 by the mechanism which I will now explain. To the shaft are secured two double clutch-pieces 8, between which is located a toothed wheel 9, having its faces formed with recesses 10 of the depth to admit one-half of each of the double clutch-pieces. On each side of the toothed wheel 9 is located a smaller toothed wheel 11, having their faces next to the larger toothed wheel recessed in the same manner as the larger toothed wheel. The inner face of the recess in the three wheels before described is provided with a series of depressions 12 of dish form. The faces of the clutch-pieces are provided with cup-shaped openings 13, in each one of which is placed a ball 14. To the pump-rod 15 is connected a yoke consisting of three vertical toothed racks. The teeth of the toothed rack 16 mesh with the teeth of the toothed wheel 9, and the teeth of the double rack 17, mesh with the teeth of the toothed wheels 11, one on each side of wheel 9. As the pump-rod moves up and down, it will carry the yoke with it, and in its upward movement the toothed racks 17 will cause the wheels 11 to rotate, which by reason of the ball-clutching mechanism causes the shaft 3 to revolve therewith. As this yoke moves upward, the toothed rack 16 will cause the toothed wheel 9 to revolve in the opposite direction to the revolution of the wheels 11, and the clutch mechanism of this wheel 9 will run idle so long as the upward movement of the rack 16 continues. In the downward movement of the yoke the wheel 9 will revolve in the same direction in which the wheels 11 revolve during the upward movement of the yoke, and its clutch mechanism will take hold of the shaft 3 and revolve it, and during the downward movement of the yoke the wheels 11 will run idle—that is, the shaft 3 is revolved in the same direction first by the yoke on its upward movement through the medium of the wheels 11 and in its downward movement through the medium of wheel 9. Thus we have a rotary movement of the shaft and the parts driven thereby by the reciprocating movement of the pump-rod.

By referring to Fig. 3 the manner in which the balls operate to form a connection between the walls and shaft will be seen, and the depressions 12 are located at such distances apart that some one of the balls will enter one of them without much backlash or lost motion.

By employing the toothed wheels 9, of larger diameter than the wheels 11, and a toothed rack for each wheel, the larger toothed wheel will form a guide for the yoke and prevent its lateral displacement, and also, as the upstroke of the windmill is more powerful than the downstroke, owing to the fact that the upstroke of the windmill exerts its force upon the converter by pulling upon the pump-rod, I can produce more revolutions of the shaft during the upstroke by the employment of the smaller toothed wheels, as in its downstroke the force is exerted by pushing upon the pump-rod, which is liable to bend or double up.

I claim as my invention—

1. The combination of a shaft, three toothed wheels loosely mounted thereon, a yoke consisting of three toothed racks, two of the toothed racks engaging the teeth of the outside toothed wheels on the same side of the shaft and the remaining toothed racks engaging the teeth of the center toothed wheel on the opposite side of the shaft, and clutching mechanism by which a rotary motion is imparted to the shaft by the reciprocating movement of the toothed racks, substantially as set forth.

2. The combination of a shaft, three toothed wheels loosely mounted thereon, the center wheel being of larger diameter than the outside wheels, a yoke consisting of three toothed racks, two of the toothed racks engaging the teeth of the smaller toothed wheels on the same side of the shaft and the remaining toothed racks engaging the teeth of the larger toothed wheel on the opposite side of the shaft, and clutching mechanism by which a rotary motion is imparted to the shaft by the reciprocating movement of the toothed racks, substantially as set forth.

ISRAEL SHOUDY, Jr.

Witnesses:
   BELLE E. SHOUDY,
   A. O. BEHEL.